(12) United States Patent
Hyder et al.

(10) Patent No.: US 8,135,704 B2
(45) Date of Patent: Mar. 13, 2012

(54) SYSTEM AND METHOD FOR LISTING DATA ACQUISITION

(75) Inventors: Adam Hyder, Los Altos, CA (US); Joseph Ting, San Jose, CA (US)

(73) Assignee: Yahoo! Inc., Sunnyvale, CA (US)

( * ) Notice: Subject to any disclaimer, the term of this patent is extended or adjusted under 35 U.S.C. 154(b) by 297 days.

(21) Appl. No.: 11/372,497

(22) Filed: Mar. 11, 2006

(65) Prior Publication Data

US 2006/0206584 A1 Sep. 14, 2006

Related U.S. Application Data

(60) Provisional application No. 60/661,280, filed on Mar. 11, 2005.

(51) Int. Cl.
*G06F 7/00* (2006.01)
*G06F 17/30* (2006.01)

(52) U.S. Cl. ........ 707/722; 707/736; 707/755; 707/756; 707/811; 707/947

(58) Field of Classification Search .................. 707/1–3, 707/10, 104.1, 101–102, 999.001, 999.003, 707/999.107, 999.101, 999.102, 705, 758, 707/706, 709, 710, 769, 944, 946, 947, 722, 707/736, 755, 756, 811; 705/11

See application file for complete search history.

(56) References Cited

U.S. PATENT DOCUMENTS

| 5,062,074 A | 10/1991 | Kleinberger et al. |
| 5,655,130 A | 8/1997 | Dodge et al. |
| 5,671,409 A | 9/1997 | Fatseas et al. |
| 5,805,747 A | 9/1998 | Bradford |
| 5,832,497 A | 11/1998 | Taylor |
| 5,884,270 A | 3/1999 | Walker et al. |
| 5,931,907 A | 8/1999 | Davies et al. |
| 5,978,768 A | 11/1999 | McGovern et al. |
| 6,006,225 A | 12/1999 | Bowman et al. |
| 6,026,388 A | 2/2000 | Liddy et al. |

(Continued)

FOREIGN PATENT DOCUMENTS

JP 2001134600 A 5/2001

(Continued)

OTHER PUBLICATIONS

Official Action from the United States Patent and Trademark Office for U.S. Appl. No. 11/174,393 dated Apr. 3, 2009.

(Continued)

*Primary Examiner* — Kuen Lu
*Assistant Examiner* — Susan F Rayyan
(74) *Attorney, Agent, or Firm* — Greenberg Traurig, LLP

(57) ABSTRACT

A method and system of data acquisition by a listing service provider is disclosed. A network address is received from a client computer that is operated by a lister. The network address can be indicative of a location of listing data on a computer network. The listing data comprises at least one information item provided by the lister. The network address received from the lister is accessed by opening a computer network connection to retrieve the listing data. The lister makes available the listing data for retrieval so that the listing data can be posted in a search bank hosted by the listing service provider. The listing data is retrieved from the network address using the computer network connection by copying the listing data onto a listing data database.

42 Claims, 9 Drawing Sheets

U.S. PATENT DOCUMENTS

| | | | |
|---|---|---|---|
| 6,052,122 | A | 4/2000 | Sutcliffe et al. |
| 6,144,944 | A | 11/2000 | Kurtzman, II et al. |
| 6,144,958 | A | 11/2000 | Ortega |
| 6,169,986 | B1 | 1/2001 | Bowman et al. |
| 6,185,558 | B1 | 2/2001 | Bowman et al. |
| 6,247,043 | B1 | 6/2001 | Bates et al. |
| 6,263,355 | B1 | 7/2001 | Harrell et al. |
| 6,304,864 | B1 | 10/2001 | Liddy et al. |
| 6,363,376 | B1 | 3/2002 | Wiens et al. |
| 6,370,510 | B1 | 4/2002 | McGovern et al. |
| 6,401,084 | B1 | 6/2002 | Ortega et al. |
| 6,434,551 | B1 | 8/2002 | Takahashi et al. |
| 6,453,312 | B1 | 9/2002 | Goiffon et al. |
| 6,502,065 | B2 | 12/2002 | Imanaka et al. |
| 6,516,312 | B1 | 2/2003 | Kraft et al. |
| 6,564,213 | B1 | 5/2003 | Ortega et al. |
| 6,571,243 | B2 | 5/2003 | Gupta et al. |
| 6,615,209 | B1 | 9/2003 | Gomes et al. |
| 6,658,423 | B1 | 12/2003 | Pugh et al. |
| 6,662,194 | B1* | 12/2003 | Joao ............................... 705/1.1 |
| 6,678,690 | B2 | 1/2004 | Kobayashi et al. |
| 6,681,223 | B1 | 1/2004 | Sundaresan |
| 6,681,247 | B1 | 1/2004 | Payton |
| 6,697,800 | B1 | 2/2004 | Jannink et al. |
| 6,711,589 | B2 | 3/2004 | Dietz |
| 6,757,674 | B2 | 6/2004 | Wiens et al. |
| 6,782,370 | B1 | 8/2004 | Stack |
| 6,853,982 | B2 | 2/2005 | Smith et al. |
| 6,853,993 | B2 | 2/2005 | Ortega |
| 6,873,996 | B2 | 3/2005 | Chand |
| 6,912,505 | B2 | 6/2005 | Linden et al. |
| 6,963,867 | B2 | 11/2005 | Ford et al. |
| 7,043,433 | B2 | 5/2006 | Hejna |
| 7,043,450 | B2 | 5/2006 | Velez et al. |
| 7,076,483 | B2 | 7/2006 | Preda et al. |
| 7,080,057 | B2 | 7/2006 | Scarborough et al. |
| 7,089,237 | B2 | 8/2006 | Turnbull et al. |
| 7,124,353 | B2 | 10/2006 | Goodwin et al. |
| 7,146,416 | B1 | 12/2006 | Yoo et al. |
| 7,191,176 | B2 | 3/2007 | McCall et al. |
| 7,225,187 | B2 | 5/2007 | Dumais et al. |
| 7,249,121 | B1 | 7/2007 | Bharat et al. |
| 7,272,610 | B2 | 9/2007 | Torres |
| 7,424,469 | B2 | 9/2008 | Ratnaparkhi |
| 7,809,709 | B1* | 10/2010 | Harrison, Jr. ................. 707/707 |
| 2001/0042000 | A1 | 11/2001 | Defoor |
| 2001/0049674 | A1 | 12/2001 | Talib et al. |
| 2002/0002479 | A1 | 1/2002 | Almog et al. |
| 2002/0026452 | A1 | 2/2002 | Baumgarten et al. |
| 2002/0038241 | A1 | 3/2002 | Hiraga |
| 2002/0072946 | A1* | 6/2002 | Richardson ....................... 705/8 |
| 2002/0073160 | A1* | 6/2002 | Purcell ........................... 709/206 |
| 2002/0090688 | A1* | 7/2002 | Kumar ........................... 435/138 |
| 2002/0091689 | A1 | 7/2002 | Wiens et al. |
| 2002/0095454 | A1* | 7/2002 | Reed et al. ..................... 709/201 |
| 2002/0099605 | A1 | 7/2002 | Weitzman et al. |
| 2002/0111843 | A1 | 8/2002 | Wellenstein et al. |
| 2002/0120532 | A1 | 8/2002 | McGovern et al. |
| 2002/0143573 | A1* | 10/2002 | Bryce et al. ......................... 705/1 |
| 2002/0147701 | A1* | 10/2002 | Chang ................................. 707/1 |
| 2002/0152051 | A1 | 10/2002 | Fukushige et al. |
| 2002/0156674 | A1 | 10/2002 | Okamoto et al. |
| 2002/0194161 | A1 | 12/2002 | McNamee et al. |
| 2002/0194166 | A1 | 12/2002 | Fowler et al. |
| 2002/0198882 | A1 | 12/2002 | Linen et al. |
| 2003/0009437 | A1 | 1/2003 | Seiler et al. |
| 2003/0014294 | A1* | 1/2003 | Yoneyama et al. ............... 705/8 |
| 2003/0014331 | A1 | 1/2003 | Simons |
| 2003/0018621 | A1 | 1/2003 | Steiner et al. |
| 2003/0023474 | A1 | 1/2003 | Helweg-Larsen |
| 2003/0028529 | A1 | 2/2003 | Cheung et al. |
| 2003/0033292 | A1 | 2/2003 | Meisel et al. |
| 2003/0046161 | A1 | 3/2003 | Kamangar et al. |
| 2003/0046311 | A1 | 3/2003 | Baidya et al. |
| 2003/0046389 | A1 | 3/2003 | Thieme |
| 2003/0061242 | A1 | 3/2003 | Warmer et al. |
| 2003/0088465 | A1 | 5/2003 | Monteverde |
| 2003/0097357 | A1 | 5/2003 | Ferrari et al. |
| 2003/0142128 | A1* | 7/2003 | Reulein et al. ................. 345/742 |
| 2003/0171927 | A1* | 9/2003 | Bernard ........................ 704/273 |
| 2003/0172145 | A1 | 9/2003 | Nguyen |
| 2003/0182171 | A1 | 9/2003 | Vianello |
| 2003/0187680 | A1 | 10/2003 | Fujino et al. |
| 2003/0191684 | A1* | 10/2003 | Lumsden et al. ................ 705/11 |
| 2003/0195877 | A1 | 10/2003 | Ford et al. |
| 2003/0204439 | A1 | 10/2003 | Cullen |
| 2003/0216930 | A1 | 11/2003 | Dunham et al. |
| 2004/0064477 | A1 | 4/2004 | Swauger |
| 2004/0107112 | A1 | 6/2004 | Cotter |
| 2004/0107123 | A1 | 6/2004 | Haffner et al. |
| 2004/0107192 | A1 | 6/2004 | Joao |
| 2004/0117189 | A1 | 6/2004 | Bennett |
| 2004/0193582 | A1 | 9/2004 | Smyth |
| 2004/0205002 | A1* | 10/2004 | Layton ............................ 705/26 |
| 2004/0210565 | A1 | 10/2004 | Lu |
| 2004/0210600 | A1 | 10/2004 | Chand |
| 2004/0225629 | A1 | 11/2004 | Eder |
| 2004/0267549 | A1* | 12/2004 | Anderson et al. ................. 705/1 |
| 2004/0267595 | A1 | 12/2004 | Woodings et al. |
| 2004/0267735 | A1 | 12/2004 | Melham |
| 2005/0004927 | A1 | 1/2005 | Singer |
| 2005/0060318 | A1* | 3/2005 | Brickman, Jr. ................. 707/10 |
| 2005/0076293 | A1 | 4/2005 | Beresnevichiene |
| 2005/0080764 | A1 | 4/2005 | Ito |
| 2005/0083906 | A1 | 4/2005 | Speicher |
| 2005/0091209 | A1 | 4/2005 | Frank et al. |
| 2005/0120294 | A1 | 6/2005 | Stefanison et al. |
| 2005/0125408 | A1* | 6/2005 | Somaroo et al. ................ 707/10 |
| 2005/0154699 | A1 | 7/2005 | Lipkin et al. |
| 2005/0192955 | A1 | 9/2005 | Farrell |
| 2005/0209955 | A1 | 9/2005 | Underwood et al. |
| 2005/0210514 | A1 | 9/2005 | Kittlaus et al. |
| 2005/0216295 | A1 | 9/2005 | Abrahamsohn |
| 2005/0278709 | A1* | 12/2005 | Sridhar et al. ................. 717/136 |
| 2006/0010108 | A1 | 1/2006 | Greenberg |
| 2006/0100919 | A1 | 5/2006 | Levine |
| 2006/0112076 | A1* | 5/2006 | Burris et al. ...................... 707/3 |
| 2006/0133595 | A1 | 6/2006 | Ravishankar |
| 2006/0155698 | A1 | 7/2006 | Vayssiere |
| 2006/0206448 | A1 | 9/2006 | Hyder |
| 2006/0206505 | A1 | 9/2006 | Hyder |
| 2006/0206517 | A1 | 9/2006 | Hyder et al. |
| 2006/0206584 | A1 | 9/2006 | Hyder et al. |
| 2006/0212466 | A1 | 9/2006 | Hyder |
| 2006/0229896 | A1 | 10/2006 | Rosen et al. |
| 2006/0229899 | A1* | 10/2006 | Hyder et al. ..................... 705/1 |
| 2006/0242013 | A1 | 10/2006 | Agarwal et al. |
| 2006/0265267 | A1 | 11/2006 | Chen et al. |
| 2006/0265268 | A1 | 11/2006 | Hyder et al. |
| 2006/0265269 | A1 | 11/2006 | Hyder et al. |
| 2006/0265270 | A1 | 11/2006 | Hyder et al. |
| 2006/0265352 | A1 | 11/2006 | Chen et al. |
| 2007/0033064 | A1* | 2/2007 | Abrahamsohn ................... 705/1 |
| 2007/0101065 | A1 | 5/2007 | Walker |
| 2007/0214140 | A1 | 9/2007 | Dom et al. |
| 2007/0239777 | A1* | 10/2007 | Toomey .................... 707/104.1 |
| 2007/0273909 | A1 | 11/2007 | Chen et al. |
| 2007/0288440 | A1* | 12/2007 | Harlow et al. ..................... 707/3 |
| 2008/0133343 | A1 | 6/2008 | Hyder et al. |
| 2008/0133499 | A1 | 6/2008 | Hyder et al. |
| 2008/0183488 | A1 | 7/2008 | Vianello |
| 2009/0198558 | A1 | 8/2009 | Chen et al. |
| 2009/0248685 | A1* | 10/2009 | Pasqualoni et al. ............... 707/6 |

FOREIGN PATENT DOCUMENTS

| | | | |
|---|---|---|---|
| JP | 2002117135 A | 4/2002 | |
| JP | 2002202983 A | 7/2002 | |
| JP | 2003242078 A | 8/2003 | |
| WO | 0146870 | 6/2001 | |

OTHER PUBLICATIONS

Official Action from the United States Patent and Trademark Office for U.S. Appl. No. 11/174,393 dated Oct. 24, 2008.

Official Action from the United States Patent and Trademark Office for U.S. Appl. No. 11/174,393 dated May 1, 2008.

Official Action from the United States Patent and Trademark Office for U.S. Appl. No. 11/174,393 dated Jul. 11, 2007.
Official Action from the United States Patent and Trademark Office for U.S. Appl. No. 11/174,393 dated Mar. 9, 2007.
Official Action from the United States Patent and Trademark Office for U.S. Appl. No. 11/174,393 dated Sep. 27, 2006.
Official Action from the United States Patent and Trademark Office for U.S. Appl. No. 11/173,837 dated Mar. 31, 2009.
Official Action from the United States Patent and Trademark Office for U.S. Appl. No. 11/173,837 dated Dec. 11, 2008.
Official Action from the United States Patent and Trademark Office for U.S. Appl. No. 11/173,837 dated May 29, 2008.
Official Action from the United States Patent and Trademark Office for U.S. Appl. No. 11/173,837 dated Jan. 4, 2008.
Official Action from the United States Patent and Trademark Office for U.S. Appl. No. 11/173,837 dated Jun. 6, 2007.
Official Action from the United States Patent and Trademark Office for U.S. Appl. No. 11/173,837 dated Mar. 9, 2007.
Official Action from the United States Patent and Trademark Office for U.S. Appl. No. 11/173,837 dated Sep. 29, 2006.
Official Action from the United States Patent and Trademark Office for U.S. Appl. No. 11/173,656 dated May 1, 2009.
Official Action from the United States Patent and Trademark Office for U.S. Appl. No. 11/173,470 dated Mar. 31, 2009.
Official Action from the United States Patent and Trademark Office for U.S. Appl. No. 11/173,470 dated Oct. 7, 2008.
Official Action from the United States Patent and Trademark Office for U.S. Appl. No. 11/173,470 dated May 29, 2008.
Official Action from the United States Patent and Trademark Office for U.S. Appl. No. 11/173,470 dated Jan. 4, 2008.
Official Action from the United States Patent and Trademark Office for U.S. Appl. No. 11/173,470 dated Mar. 9, 2007.
Official Action from the United States Patent and Trademark Office for U.S. Appl. No. 11/173,470 dated Sep. 29, 2006.
Official Action from the United States Patent and Trademark Office for U.S. Appl. No. 11/372,528 dated Apr. 1, 2009.
Notification of Concerning Transmittal of International Preliminary Report on Patentability PCT/US2006/008906).
Notification of Transmittal of the International Search Report and the Written Opinion of the International Searching Authority, or Declaration (PCT/US2006/008907).
Notification of Transmittal of the International Search Report and the Written Opinion of the International Searching Authority, or the Declaration (PCT/US06/08893).
Bettman, James R., "A Threshold Model of Attribute Satisfaction Decisions", Journal of Consumer Research Policy Board, pp. 30-35 (1974).
Official Action issued in connection with U.S. Appl. No. 11/442,443 mailed Oct. 19, 2010.
Official Action issued in connection with U.S. Appl. No. 11/136,009 mailed Sep. 17, 2010.
Official Action issued in connection with U.S. Appl. No. 11/441,997 mailed Sep. 15, 2010.
Official Action issued in connection with U.S. Appl. No. 11/135,825 mailed Sep. 15, 2010.
Official Action issued in connection with U.S. Appl. No. 12/241,497 mailed Sep. 16, 2010.
Official Action for JP 2008-501026 dated Jul. 26, 2010.
U.S. Appl. No. 10/819,768 as filed.
"Key" Oxford English Dictionary Online, located at <http://dictionary.oed.com>, last accessed on Sep. 23, 2006 (34 pgs).
Calishan, T. et al., "Google Hacks" First Printing, pp. 18-24, 33, 288-289, 293-297, Feb. 2003.
Dialog Chronolog., "New Features on DialogWeb™ ", Sep. 1998 (2 pgs).
Dialog Information Services, "DialogOnDisc User's Guide", Version 4.0 for DOS, (Jan. 1992) pp. v1, (c), 2-1, 2-2, 3-4, 3-5, 3-9, 3-10, 3-11, 3-15, 3-17, 3-19, 3-21, 4-11, 4-21, 4-22, 4-27, 5-2, 5-7, 5-8, 5-9, 2-10, 5-11, c-2.
Dialog Information Services, "DialogLink for the Windows™ Operating SystemUser's Guide", (May 1995) Version 2.1 pp. 1-2, 1-3, 4-1, 4-2, 5-2, 5-3.
DialogLink, "DialogLink for Windows and Machintosh: User's Guide", Dec. 1993, Version 2.01, P/ (cover sheet), (3-11).
dictionary.oed.com, "Oxford English Dictionary", 1989-1997, retrieved Sep. 23, 2006, 2nd Ed. (34 pgs).
Genova, Z. et al., "Efficient Summarization of URLs using CRC32 for Implementing URL Switching", Proceedings of the 37th Annual IEEE Conference on Local Computer Networks LCN'02, Nov. 2002 (2 pgs.).
Hammami, M. et al., "Webguard: Web Based Adult Content and Filtering System", Proceedings of the IEEE/WIC Conference on Web Intelligence, Oct. 2003 (5 pgs.).
Lam-Adesina, A.M. et al., "Applying Summarization Techniques for Term Selection in Relevance Feedback", SIGIR'01, ACM Press, Sep. 9, 2001 (9 pgs).
Merriam-Webster.com, "Merriam Webster Thesaurus", located at <http://web.archive.org/web/20030204132348http://www.m-w.com>, visited on Feb. 4, 2003 (7 pgs).
Netcraft, Site Report for "www.dialoweb.com", (May 10, 1998), located at <http://toolbar.netcraft.com/site_report?url=http://www.dialogweb.com> last visited on Sep. 27, 2006, (1 pg).
OED.com, "Definition of prescribed", Dec. 2003, retrieved Mar. 3, 2008, located at <http://dictionary.oed.com/cgi/ent...>(2 pgs).
Salton, G., "Abstracts of Articles in the Information Retrieval Area Selected by Gerald Salton", ACM Portal: 39-50 (1986).
Sherman, C. "Google Power, Unleash the Full Potential of Google", McGraw-Hill/Osbourne, Aug. 23, 2005, pp. 42-47, 77, 80-81, 100-107, 328-239, 421-422.
Sugiura, A. et al., "Query Routing for Web search engines: Architecture and Experiments", Computer Networks 2000, pp. 417-429, Jun. 2000, located at www.elsevier.com/locate/comnet.
Thomson Dialog. (2003) "DialogWeb Command Search Tutorial", Dialog Web Version 2.0, located at <http://support.dialog.com/techdocs/dialogweb_command_tutorial.pdf#search=%22dialogweb%22> last visited on Deceber 10, 2002, (23 pgs).
Thomson Products, Extrinsic Evidence of the Common Ownership and Distribution of DialogWeb & DialogOnDisc, located at <http://dialog.com/contacts/forms/member.shtml>, <http://dialog.com/products/platform/webinterface.shtml>, and <http://dialog.com/products/platform/desktop_app.shtml> last visited on Sep. 27, 2006 (3 pgs).
Balabanovic, M. et al. "Fab: Content-Based, Collaborative Recommendation", Communications of the ACM 40 (3):66-72, (Mar. 1997).
Kawano, H. et al., "Mondou: Web Search Engine with Textual Data Mining", 0-7803-3905, IEEE, pp. 402-405 (Mar. 1997).
Tanaka, M. et al., "Intelligent System for Topic Survey in Medline by Keyword Recommendation and Learning Text Characteristics", Genome Informatics 11:73-82, (2000).
Donath et al., "The Sociable Web" located at <http://web.web.archive.org/web/19980216205524/http://judith.www.media> visited on Aug. 14, 2003 (4 pgs).
Liu, Yi et al., "Affinity Rank: A New Scheme for Efficient Web Search", AMC 1-85113-912-8/04/0005, pp. 338-339 (May 2004).
Ji, Minwen, "Affinity-Based Management of Main Memory Database Clusters", AMC Transactions on Internet Technology, 2(4):307-339 (Nov. 2002).
Careerbuilder.com "My Job Recommendations," located at <http://www.careerbuilder.com/JobSeeker/Resumes/MyNewJobRecommendationsOrganized.aspx?sc_cmp2=JS_Nav_JobsRecs> visited on Oct. 1, 2007 (2pgs).
Careerbuilder.com "Post Your Resume on Careerbuilder.com," located at <http://www.careerbuilder.com/JobSeeker/Resumes/PostResumeNew/PostYourResume.aspx?ff=2> visited Oct. 1, 2007 (3 pgs).
Office Action issued in connection with U.S. Appl. No. 10/819,768 dated May 21, 2010.
Office Action issued in connection with U.S. Appl. No. 10/819,768 dated Dec. 22, 2009.
Office Action issued in connection with U.S. Appl. No. 10/819,768 dated Jul. 1, 2009.
Office Action issued in connection with U.S. Appl. No. 10/819,768 dated Jan. 21, 2009.

Office Action issued in connection with U.S. Appl. No. 10/819,768 dated Jul. 1, 2008.
Office Action issued in connection with U.S. Appl. No. 10/819,768 dated Dec. 20, 2007.
Office Action issued in connection with U.S. Appl. No. 10/819,768 dated Jun. 4, 2007.
Office Action issued in connection with U.S. Appl. No. 10/819,768 dated Dec. 20, 2006.

Official Action from the United States Patent and Trademark Office for U.S. Appl. No. 11/174,393 dated Aug. 19, 2009.
Official Action from the United States Patent and Trademark Office for U.S. Appl. No. 11/173,470 dated Jun. 7, 2007.
Official Action from the United States Patent and Trademark Office for U.S. Appl. No. 11/372,528 dated Jul. 8, 2011.

* cited by examiner

Yahoo! - Enter Listing Data

Yahoo! My Yahoo! Mail   Make Yahoo! your home page

Welcome, jting
(Sign Out, My Account)

Search the Web [          ] Search

Atom Home · Help

YAHOO! ATOM

Add Item - Technology

Title

302 — [                                                              ]

Details
These are the attributes specific that you wish to provide. For categories we know of, we provide you with some relevent attributes, but you can always make up your own.

304 —
| company | [Attribute Value] | ⊗ |
| Type | | |
| experience | [Attribute Value] | ⊗ |
| Type | | |
| salary | [Attribute Value] | ⊗ |
| Type | | |
| degree | [Attribute Value] | ⊗ |
| Type | | |
| start date | [Attribute Value] | ⊗ |
| Type | | |
| end date | [Attribute Value] | ⊗ |
| Type | | |

306 — Add another attribute...

Keywords
You can provide upto 10 keywords (space seperated) that describe this item.

308 — [                                                              ]

[ Clear ]

Description
Here you can provide a brief description for the item.

310 — [                                                              ]

[ Clear ]

[ Submit ] [ Preview ] [ Cancel ]

*FIG. 3A*

SYSTEM AND METHOD FOR LISTING DATA ACQUISITION

RELATED APPLICATIONS

This application claims the benefit of priority of U.S. Provisional Patent Application Ser. No. 60/661,280, filed Mar. 11, 2005. This application is related to U.S. patent application Ser. No. 11/174,393, filed on Jun. 30, 2005, entitled SYSTEM AND METHOD FOR MANAGING LISTINGS. This application is also related to U.S. patent application Ser. No. 11/173,837, filed on Jun. 30, 2005, entitled SYSTEM AND METHOD FOR IMPROVED JOB SEEKING. This application is also related to U.S. patent application Ser. No. 11/173,656, filed on Jun. 30, 2005, entitled SEEKING SYSTEM AND METHOD FOR MANAGING JOB LISTINGS. This application is also related to U.S. patent application Ser. No. 11/173,470, filed on Jun. 30, 2005, entitled JOB CATEGORIZATION SYSTEM AND METHOD. This application is also related to U.S. patent application Ser. No. 11/372,528, entitled SYSTEM AND METHOD FOR LISTING ADMINISTRATION, filed on Mar. 11, 2006. The disclosures of all referenced applications are hereby incorporated by reference in their entirety.

BACKGROUND

1. Field of the Disclosure

The present disclosure relates to listing services. In particular, it relates to systems and methods of data acquisition for listing service providers.

2. General Background

In the current generation of listing services, listing service providers use World Wide Web (web) crawlers to visit and pick-up billions of listings from every accessible source on the Internet. Typically, upon the listing service provider acquiring the listings through web crawling, the listings are processed, indexed into search banks, and published on an Internet website. Listing service providers are, for example, auction websites listing auctioned items, job databanks listing employment opportunities and openings, real estate listing companies, among others. End users, seeking specific items, are provided with an easy web search capability that allows them to extract relevant information that addresses their needs.

In addition, listers possess listing information to be conveyed to end users. Thus, for example, a lister can be any entity that sells or leases items, or provides services. Examples of listers include vehicle manufacturers and resellers, home owners, employers, etc.

Listing service providers collect data from multiple listers, classify the collected data and list the data in a searchable form so as to provide an easy to use interface for users to find the items matching the criteria of the user. Listing service providers rely heavily on the web crawlers to gather information. Listers publish listings on Internet sites utilizing different methodologies, standards, and data formats. As such, listing information obtained by web crawlers is generally unstructured and in a non-standardized format. Therefore, undirected web crawling is not completely reliable because the methodology results in poor-quality listings. Further, filtrations systems utilized to eliminate irrelevant listings obtained through undirected web-crawling require computing power that can be more productively used in other processes.

SUMMARY

In one aspect, the present disclosure is directed to a method of data acquisition by a listing service provider. As an example, a network address is received from a client computer that is operated by a lister. The network address can be a uniform resource locator. The network address can be indicative of a location of listing data on a computer network. The listing data comprises at least one information item provided by the lister. The network address received from the lister is accessed by opening a computer network connection to retrieve the listing data. The lister makes available the listing data for retrieval so that the listing data can be posted in a search bank hosted by the listing service provider. The listing data is retrieved from the network address using the computer network connection by copying the listing data onto a listing data database.

In a further exemplary aspect of the method, the listing data comprises job listing or real estate listings. In addition, the listing data in the listing data database can be analyzed for conformance to predetermined quality criteria. The listing data can also be categorized into one or more predetermined categories, and further stored in the search bank hosted by the listing service provider. Moreover, selected categorized job information data can be transferred from the search bank through a job search client server to a job searcher in response to a query by the job searcher. The listing data can be posted on an Internet website.

In another aspect of the method, an Internet website can be provided wherein a lister can administrate the listing data provided to the listing service provider. In yet another aspect of the method, the retrieved listing data is in an information resource definition language which is unique to the listing service provider. The information resource definition language can be based on extensible markup language.

In another aspect of the method, the information resource definition language is an extension of extensible markup language. For example, the information resource definition language can comprise a job element. In addition, the job element can comprise an employer company attribute and a job title attribute.

In another example, the information resource definition language can comprise a real estate element. In addition, the real estate element can comprise a location attribute and a price attribute.

In one embodiment, the network address can be provided by entering a uniform resource locator in an Internet web form hosted by the listing service provider. In another embodiment, the network address can be provided by transmitting the uniform resource locator as part of a hypertext source code tag.

In another aspect, an embodiment of the disclosure is a system for data acquisition by a listing service provider comprising an address receiving module and a web crawling module. The address receiving module receives a network address from a client computer that is operated by a lister. The network address is indicative of a location of listing data on a computer network. The listing data comprises at least one information item provided by the lister. The web crawling module accesses the network address received from the lister. The network address is accessed by opening a computer network connection to retrieve the listing data. The lister makes available the listing data for retrieval so that the listing data can be posted in a search bank hosted by the listing service provider. The web crawling module is configured to retrieve the listing data from the network address using the computer network connection by copying the listing data onto a listing data database.

In yet another aspect, a computer readable medium encoding a computer program of instructions for executing a computer process for data acquisition by a listing service provider.

The computer process may comprise multiple steps. A network address is received from a client computer that is operated by a lister. The network address can be indicative of a location of listing data on a computer network. The listing data comprises at least one information item provided by the lister. The network address received from the lister is accessed by opening a computer network connection to retrieve the listing data. The lister makes available the listing data for retrieval so that the listing data can be posted in a search bank hosted by the listing service provider. The listing data is retrieved from the network address using the computer network connection by copying the listing data onto a listing data database.

DRAWINGS

By way of example, reference will now be made to the accompanying drawings.

FIG. 3A illustrates a screen shot of a web form for entering listing data in a web browser in accordance with the present disclosure.

DETAILED DESCRIPTION

A system and method of listing data collection and delivery is disclosed. Unlike traditional systems and methods of data acquisition, which rely on web crawling of non-standardized listing data, the system and method provided herein allows listers and listing service providers to communicate via a standard language. Thus, accurate and updated listing data can be provided to listing service providers. In addition, listers also benefit from better categorized listing data and thereby have higher chances that their listings will be easily accessed by users.

A listing service provider can utilize a directed web crawler to acquire data more accurately and efficiently. Furthermore, an Information Resource Definition (IRD) language can be utilized as a means for communication between a lister and the listing service provider.

In one embodiment, a lister can place listing data on a secure site and give to a listing service provider an indication of the location of the listing data. The listing service provider can then utilize a directed web crawler to collect the listing data at the specified location. In addition, the listing service provider can interpret the data based on standardized definitions. Therefore, a "pull" methodology may be used to acquire data at the listing manager. In this methodology, the lister provides to the listing service provider two pieces of information to find the data: the location of the data and the format of the data. Once the listing service provider receives this information, a directed web crawler can "pull" or collect the information from the specified location.

In another embodiment, listers are also provided with the capability to submit listing data to a listing service provider. Thus, a "push" methodology may be used to acquire data at the listing manager. Listers can utilize the Information Resource Definition (IRD) rules and deliver or push listing data to the listing service provider. The data delivered to the listing service provider can be formatted to comply with the IRD rules such that the listing service provider can interpret the data submitted.

Figure 1:
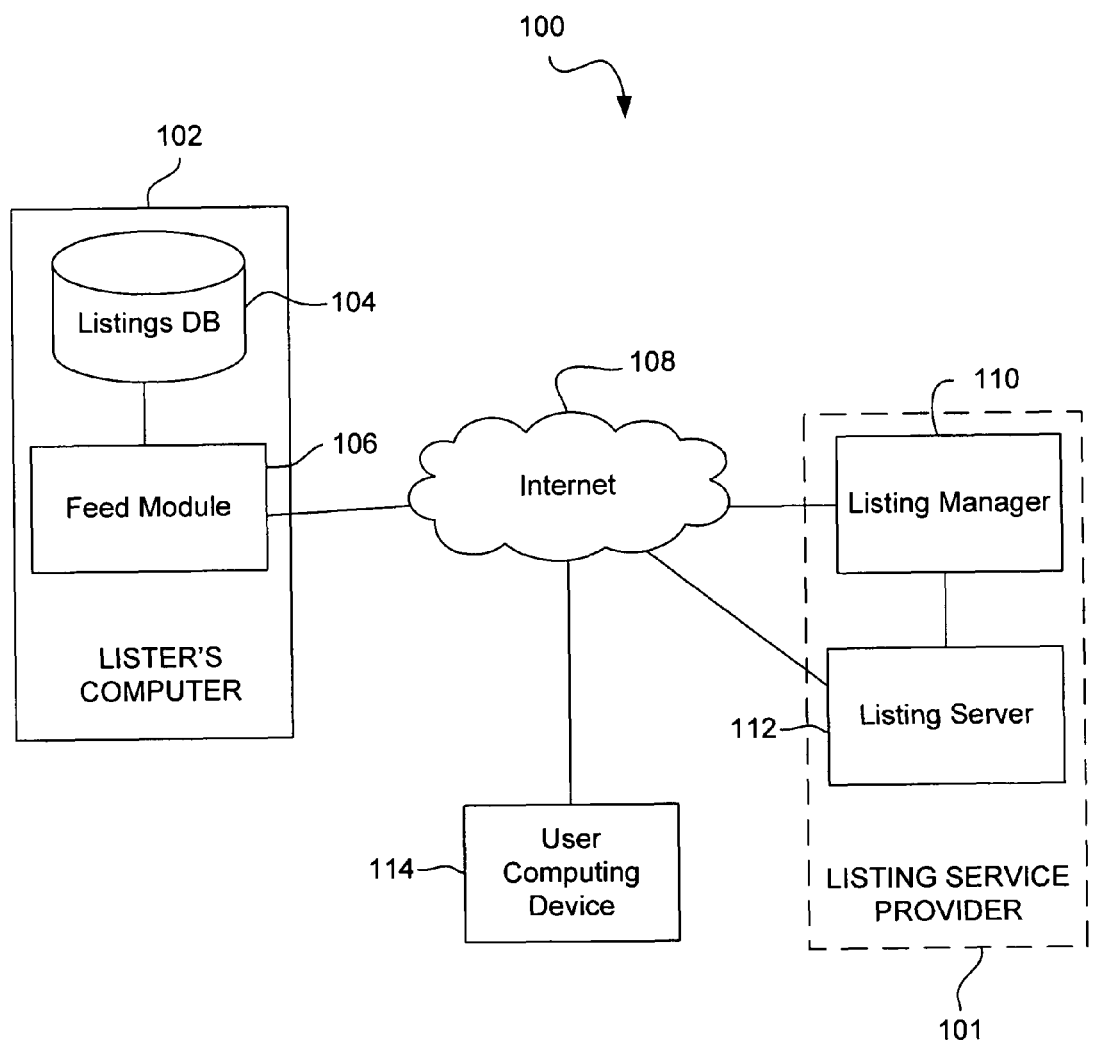
FIG. 1 illustrates a listing data acquisition system in accordance with the present disclosure.

FIG. 1 illustrates a listing data acquisition system 100 in accordance with the present disclosure. A lister can provide listing data to a listing service provider 101 that posts listing data on the Internet 108. In one example, the lister utilizes a lister's computer 102 to communicate with a listing manager 110 through the Internet 108. The listing manager 110 can be a computer server managed by the listing service provider 101.

In one embodiment, the lister's computer 102 can include a listings database 104 that stores listing data ready for publication. For example, an employer having job openings in its engineering division can store job listings in the listings database 104 that are later transmitted to a listing service provider 101. The lister's computer can further include a feed module 106 that retrieves listing data from the listings database 104. In one embodiment, the feed module 106 delivers the retrieved listing data to the listing manager 110. In another embodiment, the feed module 106 places the retrieved listing data in a network-accessible site for the listing manager 110 to collect through the Internet 108.

The listing manager 110 can be a computing module, which resides in a computer infrastructure of a listing service provider 101. Alternatively, the listing manager 110 can be a computer server that resides in a computer infrastructure of a listing service provider 101. For example, a job listing service provider 101 can utilize a computer infrastructure to post all available job listings on the Internet 108. The listing manager 110 can reside in a computer server connected to the Internet 108. The listing data can be acquired by either requesting the data from the feed module 106, scraping the data published on the Internet 108 by the feed module 106, or by simply receiving the listing data submitted by the feed module 106.

In addition, once the listing information is acquired from the lister's computer 102, the listing manager 110 can provide the listing information to a listing server 112, which in turn publishes, or otherwise makes available, the listing information on the Internet 108. The listing server 112 can be for example, a web server, an ftp server, or any other server configured to post information on the Internet 108 for user viewing and searching.

Once published and listed, the listing data is available for users to view and search the listing data at a user computing device 114. The user computing device 114 can be any personal computer, a handheld device, etc., that can access the Internet. Upon sending a request, the user computing device 114 receives listing information posted by the listing server 112. In one embodiment, the user computing device 114 can receive the listing data either on a request to the listing server 112, wherein the user computing device 114 includes a web browser and requests listing data from the listing server 112. In another embodiment, the user computing device 114 receives the listing data based on a transmission by the listing server 112, wherein the transmission is initiated by the listing server 112. In one example, the user computing device 114 receives a Really Simple Syndication (RSS) feed. In another example, the user computing device 114 receives a podcast.

As previously mentioned, listers are provided the opportunity to render accurate listing data to a listing service provider 101 by using a common standardized format. The lister computer 102 allows a lister to transmit listing data to a listing service by "pushing" the relevant listing data to the listing manager 110 through the Internet 108. In addition, the lister computer 102 allows a lister to transmit the location of the listing data to a listing service so that the listing service can "pull" the relevant listing data and process the listing data in the listing manager 110.

Push Methodology

Listers can transmit listing data to a listing service provider 101 at any time by directly feeding the listing data. Therefore, the listing service provider 101 does not have to web crawl the Internet to acquire such listing information. In addition, the listing data that is provided to the lister can be in a standard format.

The lister can "push" the data to the listing service provider 101 through interfaces provided by the listing service provider 101. In one example, the listing service provider 101 makes available a website that has data fields for entering listing data. In another example, the listing service provider 101 makes available a file upload site in which a lister can provide the name of a file in a pre-specified format for uploading. In yet another example, the listing service provider 101 provides application programming interface (APIs) functions for the lister to develop a computer application for distributing the data to the listing service provider 101.

Figure 2:
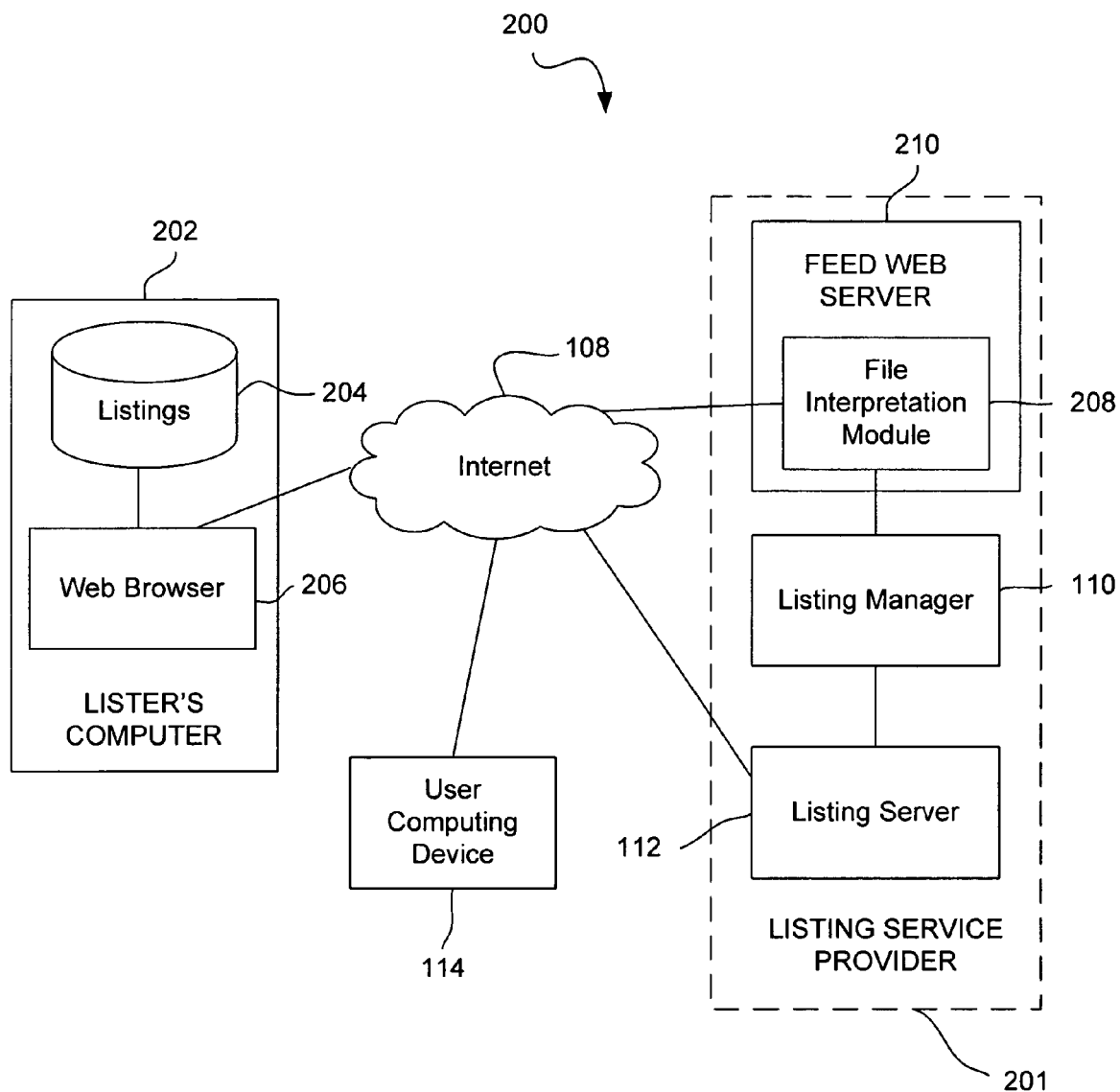
FIG. 2 illustrates a listing data acquisition system in which a lister feeds listing data to a listing service provider over a computer network utilizing a web interface in accordance with the present disclosure.

FIG. 2 illustrates a listing data acquisition system 200 in which a lister feeds listing data to a listing service provider 201 over a computer network utilizing a web interface in accordance with the present disclosure. The computer network may be for example Internet 108. A lister's computer 202 can connect to a feed web server 210 to provide listing data. For example, a user at the first lister's computer 202 can utilize a web browser 206 to access a web page hosted by the feed web server 210.

In one embodiment, the web form provided by the feed web server 210 is a form having one or more fields where data can be entered. The web browser 206 can display the forms hosted by the feed web server 210 and allow the user to enter listing data in the forms.

In another embodiment, the web interface provided by the feed web server 210 allows a lister to designate a file containing listing data for uploading. Thus, the lister at the lister's computer 202 can provide a file path indicative of the location of the file to be uploaded. Files of various formats can be uploaded and later parsed by the file interpretation module 208. In one example, the file is an Excel spreadsheet file. In another example, the file is an Extensible Markup Language (XML) file. In yet another example, the file is a Human Resources Extensible Markup Language (XML) file. In another example, the file is a Resource Description Framework (RDF) file.

Once the file has been interpreted by the file interpretation module 208, the feed web server 210 can transmit the listing data to the listing manager 110 for processing, categorization, sanitation of data, data format check, regular expression check, etc. In addition, a fraud pre-filtration process can be performed in order to verify that the data provided is current, relevant, and non-fraudulent. Categories for fraud filtration of data may include offensive listings, illegal listings, irrelevant listings, etc. Techniques utilized in automatic categorization of listing data, including job listings, are described in detail in the U.S. patent application Ser. No 10/920,588, filed August, 2004, and entitled Automatic Product Categorization, assigned to the assigned of this disclosure.

Upon processing the listing data, the listing manager 110 can further relay the listing data to the listing server 112 for posting the listings on a website on the Internet 108. Thereafter, a user searching for listed items of interest (e.g., a job seeker, a homebuyer, etc) can access, through the user computing device 114, the listing data via the listing service provider 101.

FIG. 3A illustrates a screen shot of a web form 300 for entering listing data in a web browser in accordance with the present disclosure. The web form 300 can be provided by the listing service provider 201 and hosted at the feed web server 210. In one embodiment, the listing service provider 201 services listing of job listing information, and the web form 300 includes fields for entering a new job opening. Therefore, a lister such as an employer can enter a new job listing in the web form 300 which can later be displayed at the website of the listing service provider 201. A title field 302 can be provided to enter a title or designation for the job listing. Attribute fields 304 can be provided for entering further information regarding the listing being entered. For example, for a job listing, attributes that can be entered in the attribute fields 304 include company, experience, salary, degree, start date, end date, etc. Furthermore, the lister entering data, such as the employer, can configure additional attributes in association with the listing being entered. For example, if the job lister wishes to entered another attribute, such as a field for 401K benefits, the job lister can add a retirement benefits field by selecting an add function 306. In addition, a keyword field 308 and a description field 310 can also be provided to the lister in order to further qualify the listed job.

Figure 3B:
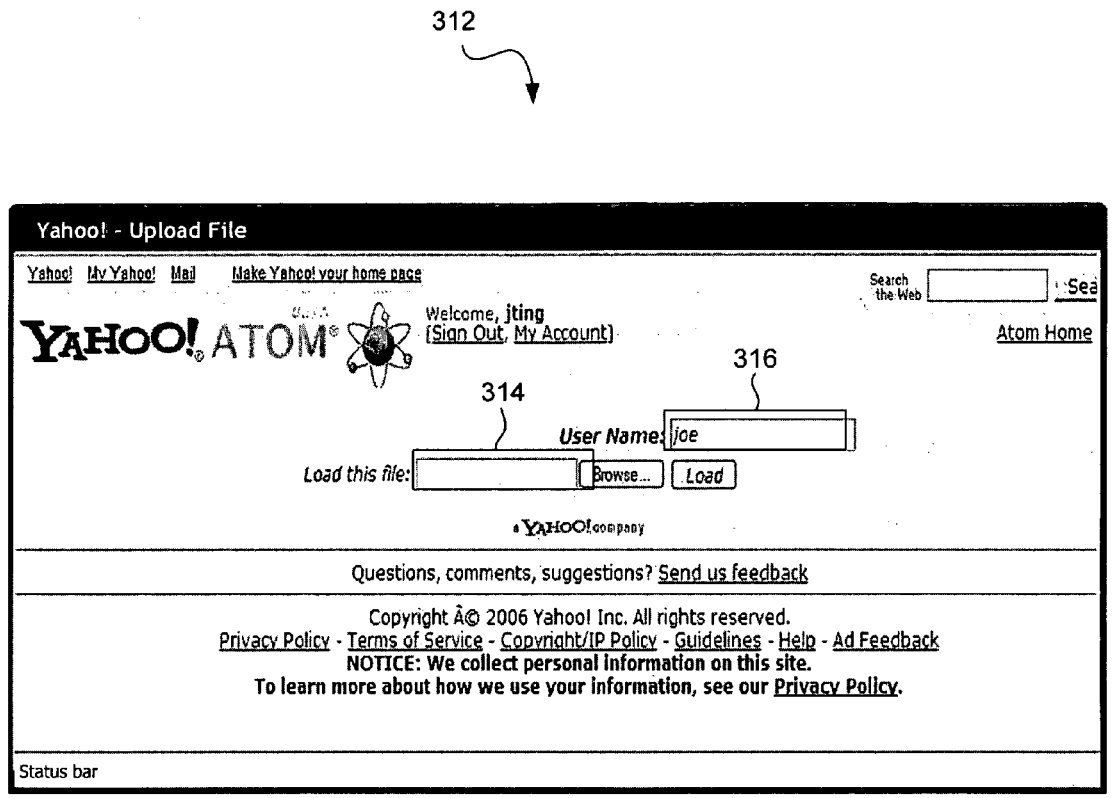
FIG. 3B illustrates a screen shot of a web form to upload a data file at a web browser in accordance with the present disclosure.

FIG. 3B illustrates a screen shot of an exemplary web form 312 that is used to upload a data file via a web browser in accordance with the present disclosure. As described above, a listing service provider 201 can further allow listers to upload data files containing listing data. The web form 312 can include a file path data field 314 to enter the location of the file to be uploaded.

In one embodiment, a lister may be a frequent user. The lister can be provided with a preconfigured or user defined a username for identification. The lister can upload a file under the username. The feed web server 210 can parse the uploaded file and further associate the listings in the file to the lister. The lister can then be provided with the ability to administrate the submitted data listings. In another embodiment, a lister as a first-time user, is not required to have a username to upload a listing data file.

The file that is uploaded by the lister can be formatted in a standard format, which is also known to the file interpretation module 208. The file interpretation module 208 can include rules and definitions for an IRD file. In one example, the information resource definition can be established as shown in Table A. Table A below shows exemplary elements and corresponding attributes of an IRD file.

TABLE A

| Element | Attributes | Description |
|---|---|---|
| ird:rd | | Identifies a new resource to be crawled by the crawler. |
| | ird:property | The vertical identifier to place the new resource. "hj" = "Yahoo! HotJobs" |
| | ird:ttl | The "Time to Live" of the resource. How often this resource is refreshed. |
| | ird:gid | The id supplied by Yahoo! HotJobs |
| job:company | | Company. |
| | job:name | A Name. |
| job:contact | | Contact information for a person or corporation. |
| | job:name | A Name. |
| job:listing | | A listing for a particular resource. |
| | job:display_type | How this listing should be displayed by Yahoo!. Premium - a fee-based listing where the resource provider is charged to get special treatment for the listing. Normal- Normal treatment for this listing. |
| job:title | | Title of the Job. |
| job:description | | Description of the Job. |
| job:category | | Category of the Job:<br>Accounting_Finance — FIN<br>Advertising_Public_Relations — ADV<br>Arts_Entertainment_Publishing — ART<br>Banking_Mortgage — BAM<br>Clerical_Administrative — ADM<br>Construction_Facilities — CON<br>Customer_Service — CUS<br>Education_Training — EDU<br>Engineering_Architecture — ENG<br>Government — GOV<br>Health_Care — HEA<br>Hospitality_Travel — HOS<br>Human_Resources — HRS<br>Insurance — INS<br>Internet_New_Media — NEW<br>Law_Enforcement_Security — LAW<br>Legal — LEG<br>Management_Consulting — MCO<br>Manufacturing_Operations — MAN<br>Marketing — MAR<br>Non_Profit_Volunteer — NON<br>Pharmaceutical_Biotech — SCI<br>Real_Estate — RLE<br>Restaurant_Food_Service — RFS<br>Retail — PUR<br>Sales — SAL<br>Technology — MIS<br>Telecommunications — TEL<br>Transportation_Logistics — TRA<br>Work_At_Home — OTH |
| job:experience | | Level of experience required for the job. |
| job:status | | Full-Time or Part-Time |
| job:level | | Level of education required. <BS, MS, PHD> |
| job:salary | | Salary/Wage of the job. |
| job:preurl | | If cookies are required to view the URL, this is the URL that must be accessed to obtain the cookies. |
| job:url | | URL for the hosting web page of the Job. |
| ird:location | | A Location. A job listing can have multiple locations. Each separate location of the job will be treated as a separate listing. |
| job:address | | Location - Street address of the job. |
| job:city | | Location - City of the Job. |
| job:state | | Location - State of the Job. |
| job:country | | Location- Country of the Job. |

Table A shows an IRD syntax for providing job listings. In one example, the IRD syntax properties for a job listing can include company, title, description, category, experience, status, level, salary, etc. In addition, each property may include further attributes. Thus, for example, a lister that wants to post a job listing may provide the listing data in IRD format. A source code example of the contents of an IRD file that can be uploaded is as follows:

```
<?xml version="1.0"?>
<rdf:RDF xmlns:rdf="http://www.w3.org/1999/02.22-rdf-syntax-ns#"
    xmlns:ird="http://www.yahoo.com/2005-07-21-feed-syntax">
    xmlns:job="http://www.hotjobs.com/2005-07-21-hj-feed-syntax">
    <ird:rd ird:property="hj" ird:ttl="5 days" ird:custodian=admin@yahoo-inc.com ird:gid:xxx4783>
        <job:company job:name="Yahoo!">
```

```
        <job:url> www.yahoo.com </job:url>
        <ird:location>
            <job:address> 701 N. First Street </job:address>
            <job:city> Sunnyvale </job:city>
            <job:state> CA </job:state>
            <job:country> US </job:country>
        </ird:location>
        <job:contact job:name = "Adam Hyder">
                <job:email> ah@yahoo-inc.com </job:email>
                <job:phone1> 408 349-xxxx </job:phone1>
        </job:contact>
        <job:listing job:display_type: normal>
                <job:title> Technical Yahoo! </job:title>
                <job:description> Does some technical stuff. </job:description>
                <job:category> MIS </job:category>
                <job:experience> 5+ yrs </job:experience>
                <job:status> Full-Time </job:status>
                <job:level> BS Degree </job:level>
                <job:salary> $100,000 </job:salary>
                <job:preurl> www.yahoo.com/careers/list.html </job:preurl>
                <job:url> www.yahoo.com/careers/jobdetail1.html </job:url>
                <ird:location>
                    <job:address> 701 N. First Street </job:address>
                    <job:city> Sunnyvale </job:city>
                    <job:state> CA </job:state>
                    <job:country> US </job:country>
                </ird:location>
        </job:listing>
        <job:listing job:display_type: premium>
                <job:title> Sr. Technical Yahoo! </job:title>
                <job:description> Does some very technical stuff. </job:description>
                <job:category> MIS </job:category>
                <job:experience> 10+ yrs </job:experience>
                <job:status> Full-Time </job:status>
                <job:level> BS Degree </job:level>
                <job:salary> $120,000 </job:salary>
                <job:preurl> www.yahoo.com/careers/list.html </job:preurl>
                <job:url> www.yahoo.com/careers/jobdetail1.html </job:url>
                <ird:location>
                    <job:address> 701 N. First Street </job:address>
                    <job:city> Sunnyvale </job:city>
                    <job:state> CA </job:state>
                    <job:country> US </job:country>
                </ird:location>
        </job:listing>
    </job:company>
  </ird:rd>
</rdf:RDF>
```

Figure 4:
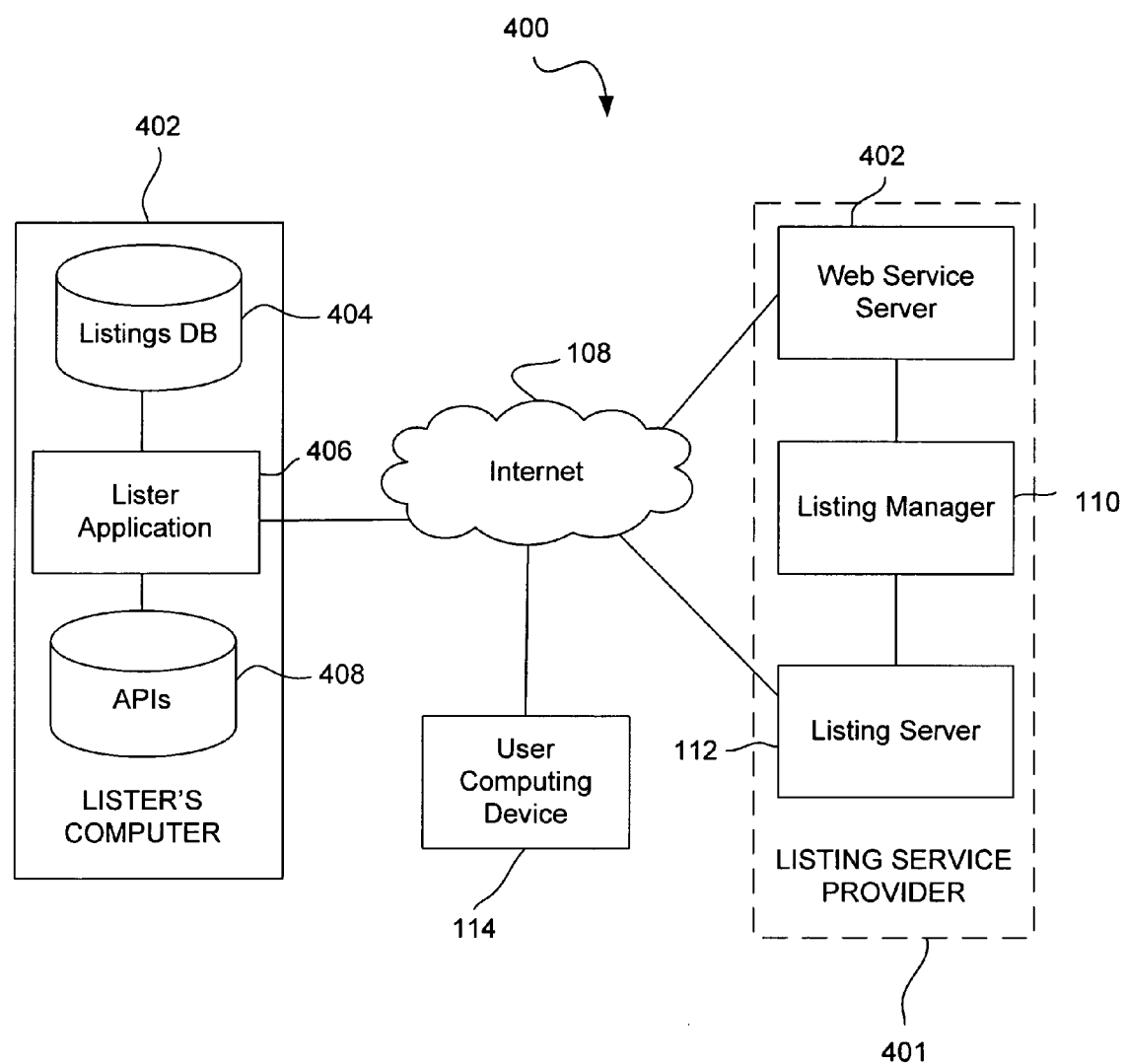
FIG. 4 illustrates a listing data acquisition system in which a lister feeds data to a listing service provider over a computer network utilizing a computer application in accordance with the present disclosure.

FIG. 4 illustrates a listing data acquisition system 400 in which a lister feeds data to a listing service provider 401 over a computer network utilizing a computer application 406 in accordance with the present disclosure. In one example, a lister's computer 402 can be provided with application program interface (API) commands in an application development kit. The application development kit includes API commands for a specific format, message types, etc., that the web service server 402 is able to interpret. API commands can include for example, commands for transmission of data, commands for acknowledgment of data received, commands for encryption/decryption of data, and other functions indicating the type of data being transmitted, etc. The web service server 402 either accepts or rejects data transmitted from one or more client computers via the Internet 108 depending on whether the API is calls are correctly invoked.

A lister can utilize the APIs to include interfacing commands in a lister application 406 in order to interface automatically and directly with the web service server 402. As such, the lister can program existing applications or develop a new application that can retrieve listing data from a local listing database 404, and transmit such listing data to the web service server 402. For example, a lister can develop the computer application 406 to periodically retrieve listing data from the listing database 404 and transmit the data to the web service server 402. In another example, the lister can simply incorporate the APIs provided by the listing service provider 401 into existing applications, and make calls to the provided APIs in order to submit the data to the listing service provider 401. In yet another example, the lister can develop an application for data entry and submission to the web service server 402.

In another embodiment, the application development kit provides APIs that encode data in an IRD format for transmission to the web service server 402. As such, the web service server 402 can include, or be interfaced with, a file interpretation module 208 as illustrated in FIG. 2. The lister application 406 can be implemented to package listing data in IRD format for transmission to the web service server 402. The implementation of the lister application 406 can include API calls for encoding the data to IRD format and for transmitting the listing data directly to the file interpretation module 208.

The file interpretation module 208 can reside at the web service server 402, or any other server shared by other processes in the computer configuration of the listing service provider 401. After the web service module 218 parses and interprets the listing data received, the web service module 210 transmits the data to the listing manger 110 for further processing, categorization, etc. Here again, the listing data is then published on a web site by the listing server 112 and then later viewed at a user computing device 114.

Pull Methodology

A data acquisition system can be used by a listing service provider in order to enhance the data acquisition model such that the data is gathered from specific Internet locations. In other words, listers can provide the location of the data to the listing service provider, which, in turn, collects or "pulls" the data from the network location provided by the lister. Once the listing service provider is provided with information regarding the location of the listing data, the listing service provider can initiate a directed web crawler to collect the data at the specific network location provided by the lister.

A directed web crawler can be a web crawler having a predetermined location on the Internet. Unlike traditional web crawlers, which crawl travel around the Internet without a specific destination a directed web crawler can collect the information from a specific location with the assurance that useful and meaningful data can be found at each visited web site.

Figure 5:
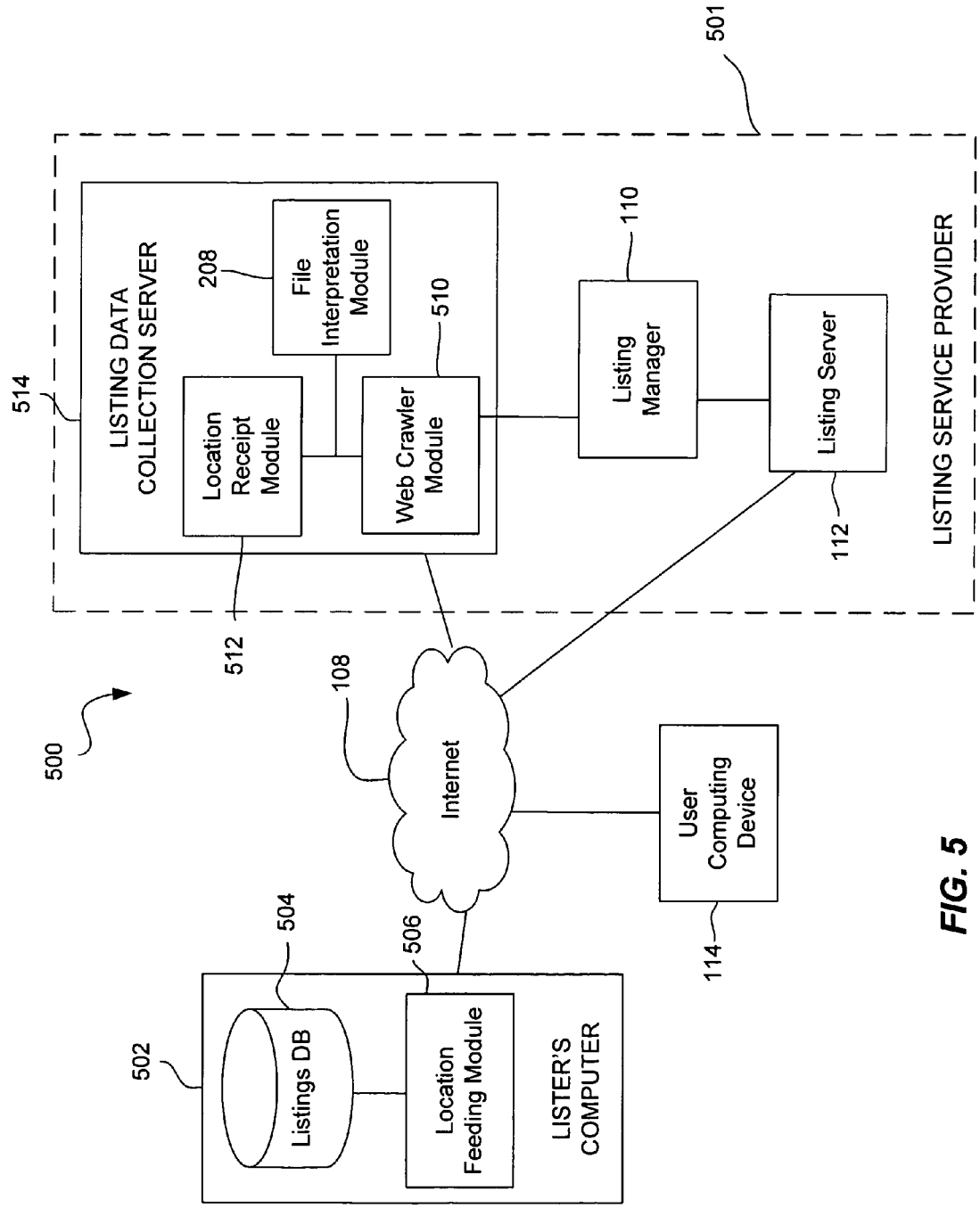
FIG. 5 illustrates a listing data acquisition system in which a listing service provider acquires data from a lister using a directed web crawler in accordance with the present disclosure.

FIG. 5 illustrates a listing data acquisition system 500 in which a listing service provider 501 acquires data from a lister using a directed web crawler in accordance with the present disclosure. A listing service provider 501 can utilize a lister's computer 502 communicably connected to the Internet 108 to provide a destination location to a web crawler module 510. The destination location can be a universal resource locator (URL) that references an ftp site, web site, or any other electronically accessible storing module. The lister's computer 502 can provide a destination location via a location feeding module 506. The listing service provider 501 can receive the listing data location at a listing data collection server 514. In particular, the listing data location can be received at a location receipt module 512. In one example, the location feeding module 506 can be a web browser wherein a user can enter a URL path. In another example, the location feeding module 506 provides markup language source code including a reference to the URL path. In yet another embodiment, the location feeding module 506 can be a separate process that connects directly to the location receipt module 512.

Furthermore, the location feeding module 506 can permit a lister to provide additional information to the location receipt module 510. For instance, the location feeding module 506 can permit the lister to schedule data collection times. In another example, the lister can set the frequency of data collections. Furthermore, the location feeding module 506 can be configured such that higher data collection frequency would entail a charge to the lister on a per-listing basis. Once the location of the listing data is received at the location receipt module 512, the web crawler module 510 can be activated to web crawl and collect the data from the indicated location. The crawling process can be activated periodically (e.g. every fifteen minutes), or with a frequency indicated by the user.

In addition, the lister's computer 502 can include a listings database 504 that stores the listing data that the lister wishes to post to the Internet. In one embodiment, the listing database 504 is a single file. In another embodiment, the listing database 504 is a collection of files. The listings database 604 can be partially accessible via the network location supplied to the location receipt module 512. Alternatively, the listings database 604 can be fully accessible. Furthermore, the location of the listings database 604 can be in one or distributed across multiple sites or locations.

The listings database 504 may comprise a text file, which can be collected by the web crawler module 512. The text file can include the listing data in a data format that is recognized by the file interpretation module 208. In addition, the text file can include listing data in a data format that is specific to the listing data collection server 514 such that only the file interpretation module 208 can fully interpret the data. As such, the file presented can be in an Excel, HR-XML, RDF, or other format. In addition, the file presented can also be in IRD format, as discussed above.

Once the file is collected, the file interpretation module 208 interprets the data based on the IRD definitions, and provides the data to the listing manager 110. As stated above, the listing manger 110 can provide data cleansing, removal of duplicate entries, quality checking, categorization, etc.

Figure 6A:
FIG. 6A illustrates a source code example for including a reference to universal resource locator in accordance with the present disclosure.

FIG. 6A illustrates a source code example for including a reference to URL in accordance with the present disclosure. The universal resource locator can reference to an IRD file. In one example, the web crawler module 510, as part of collecting data at specific locations that have been previously specified, can also search Internet sites for source code indicating new listing data files. In another example, a separate crawling process can be used with the single task of retrieving URL addresses, which are later visited by the web crawler module 510 for collection of the listing data file.

In one embodiment, the source code with the resource URL can be embedded in an existing HTML source code of the lister's web pages. Regular HTML readers and parsers can disregard the data in the file. Specialized web crawling processes however, can be configured to recognize tags associated with the resource URL and retrieve information related to the resource URL.

In another embodiment, the source code can be in a separate file in a designated directory (e.g., root directory of the lister's site). Thus, for example, at the top level of the site of the lister, a pre-established name that indicates the presence of a resource URL can be used (e.g. resource.xml). Each resource URL can be further identified by syntax unique to a standard language, such as IRD. Therefore, if the resource URL references an IRD file, then the IRD file can contain properties, attributes, and other elements specific to the IRD language.

Figure 6B:
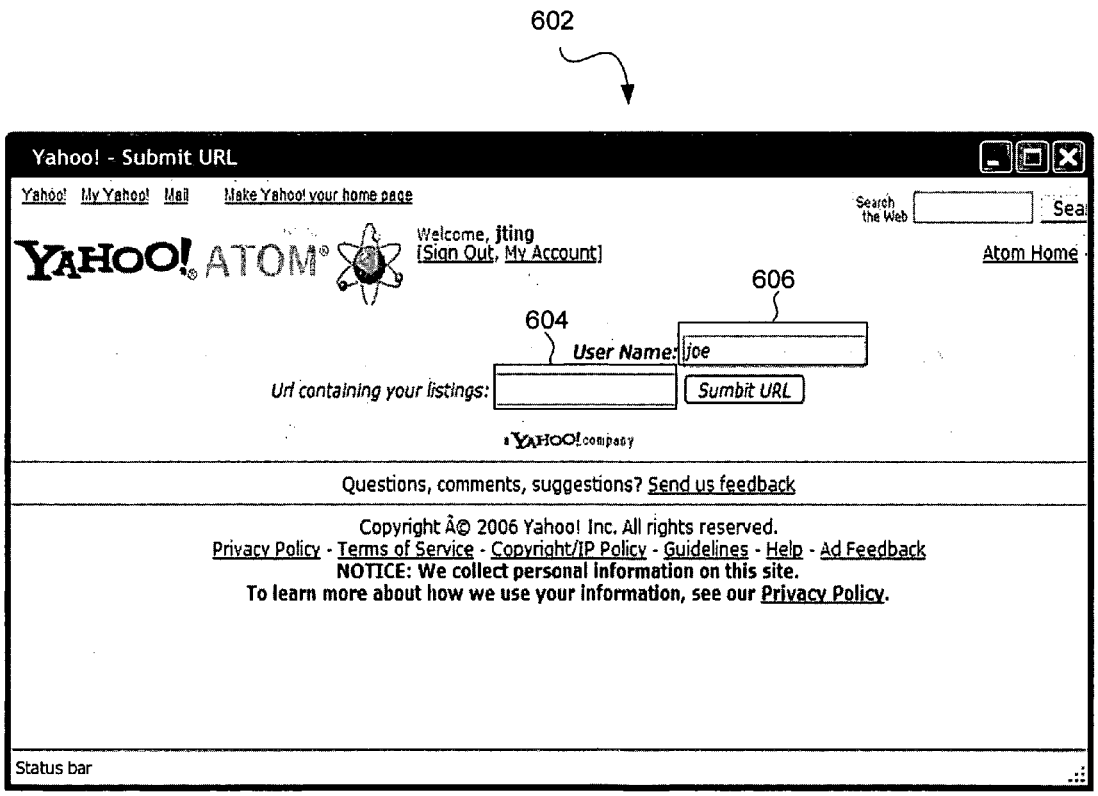
FIG. 6B illustrates a screen shot of a web form to submit a location of a listing data file in accordance with the present disclosure.

FIG. 6B illustrates a screen shot of a web form 602 to submit a location of a listing data file in accordance with the present disclosure. As described above, a listing service provider 501 can further allow listers to enter a uniform resource locator address in a web form field 604. The URL can point to files in various formats. As previously discussed, one such file format can be the IRD file format.

In addition, a lister can be a frequent user provided with a username for identification. The lister can then enter the username at username field 606. The lister can transmit a URL under a preconfigured username. Upon collecting the listing data at the URL, the web crawler module 510 can relay the collected listing data to the listing data collection server 514 for further processing which includes associating the data listings in the file to the lister. The lister can then be provided with the ability administrate the submitted data listings. In another embodiment, a lister is a first-time user that is not required to have a username to upload a listing data file.

Figure 7:
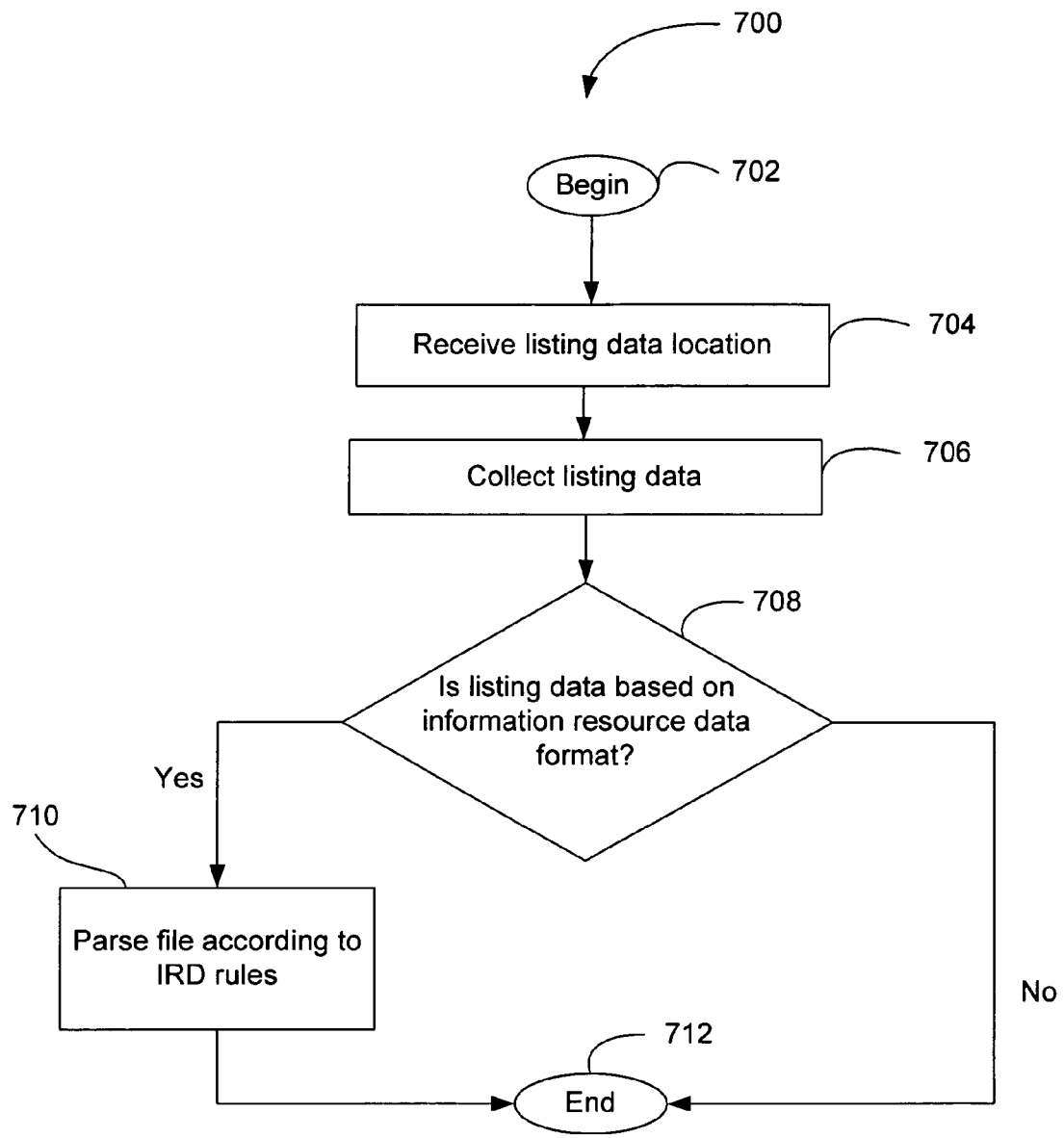
FIG. 7 illustrates a data flow diagram for a process of collection of listing data in accordance with the present disclosure.

FIG. 7 illustrates a flow diagram for a listing data collection process in accordance with the present disclosure. A process 700 can be provided for data acquisition via directed crawling. The process begins at process block 702. At process block 704, the listing data location (e.g. a universal resource locator) is provided. In one embodiment, the listing data locating can be transmitted from the location feeding module 506 to a location receipt module 512. For example, a URL can be transmitted to the location receipt module 512 through a web form that is hosted by the listing data collection server 514. In another embodiment, the universal resource locator can be provided by embedding code in existing webpages that are later transmitted or visited by the web crawler module 510. Next, at process block 706, listing data is collected from the location referenced by the uniform resource locator. In one example, listing data is collected by a directed web crawler that has specific information about the data path of the listing data. Once the listing data is collected, at decision block 708, it is determined whether the listing data is presented in information resource data format. If it is determined that the listing data is presented in information resource data format then at process block 710 the listing data is interpreted according to rules defining the information resource data format. If it is determined that the listing data is not presented according to information resource data format, the process 700 ends at process block 712.

PALM Integration

Figure 8:
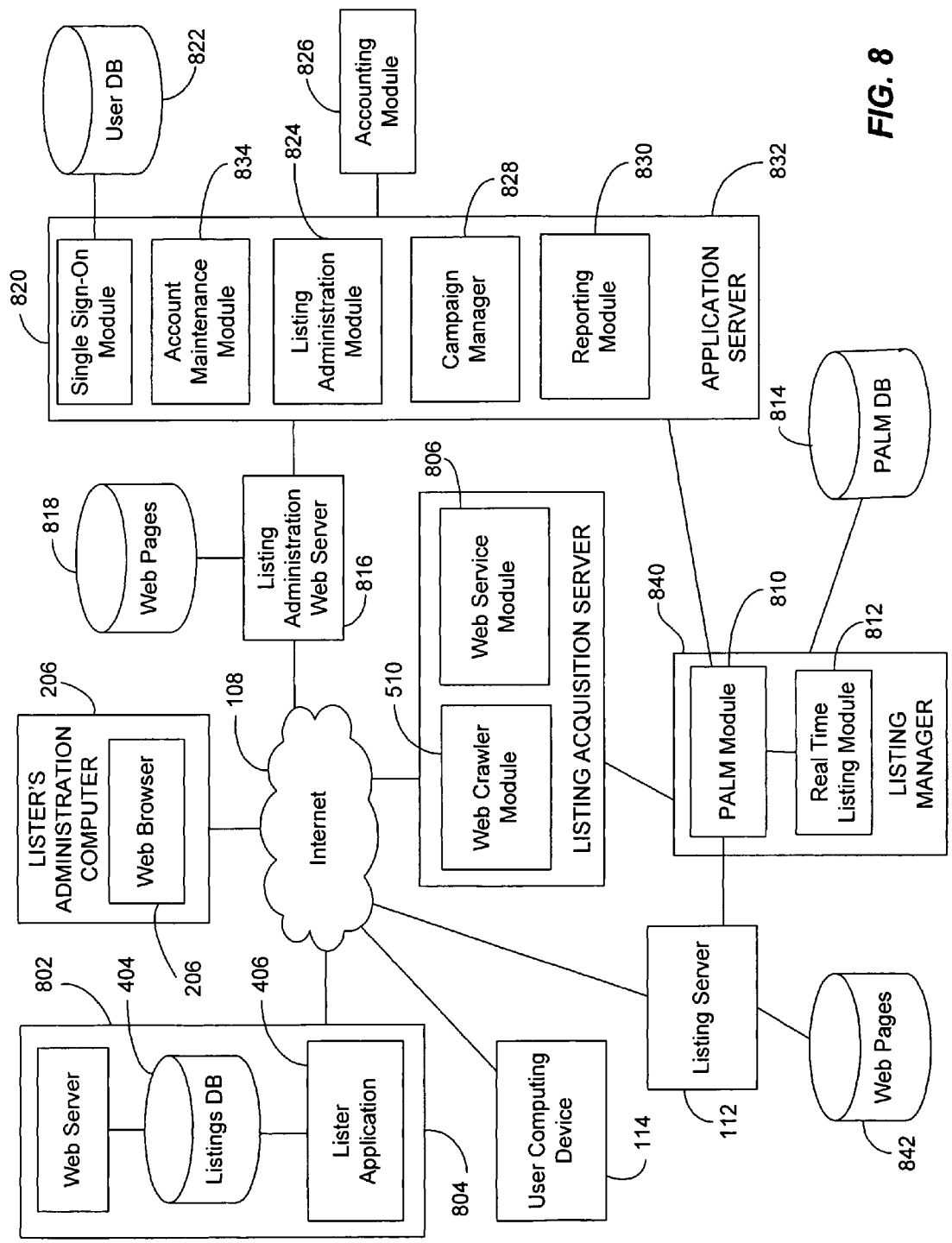
FIG. 8 illustrates an integrated system for data acquisition and administration in accordance with the present disclosure.

FIG. 8 illustrates an integrated system 800 for data acquisition and administration in accordance with the present disclosure. In one embodiment, a data acquisition server 836 can house the web crawler module 510 and a web service module 806. The data acquisition server 836 allows the listing service provider 501 to acquire listing data from a lister through various techniques as described above. The data acquisition server 836 can interact with a listing manager 110 that categorizes, filters, cleanses, and in generally maintains the listings located at PALM (platform for advanced listing management) database 814.

In one embodiment, the listing manager utilizes a PALM module 810 to process submitted or acquired listing information. The PALM module 810 and functionalities are described in detail in the U.S. patent application Ser. No. 11/174,393, filed Jun. 30, 2005, and entitled System and Method for Managing Listings, assigned to the assignee of the present application In addition, the listing manager 110 can include a real time listing module 812 the permits the immediate posting of recently acquired listings at the listing server 112. In one embodiment, the listing server 112 can access a webpages database 808 that stores data for providing listing webpages.

In another embodiment, an application server 832 can be communicated with a listing administration web server 816. The listing administration web server 816 allows listers to check the status of submitted listing data, or listing data that was placed at a website for collection by the listing service provider.

The application server 832 may include modules for administrating listings associated with a lister. For example, a sign-on module 840 that interacts with a user database 822 includes logic to permit a lister to sign-in and gain access to administrative privileges. The application server 832 can further interact with an accounting module 826 that tracks financial gains and other monetary aspects related to the account of the lister. In addition, multiple operational modules can be provided in the application server 832 to allow a user to administrate listings, track performance and return on investment, set-up campaigns, etc.

Communicating with the listing administration server 816 may be an application server 820. The application server 820 includes an account maintenance module 834, a listing administration module 824, a campaign manager 828, and a reporting module 830. The account maintenance module 834 can provide the lister with an interface for viewing, paying or inquiring the latest billing, profile maintenance, set-up multiple accounts, etc.

The listing administration module 824 permits a lister to add, delete, or edit listings. The campaign manager 828 can permit a lister to set-up campaigns for a listing or a group of listings. Finally, the reporting module 830 permits a lister to view the performance of listings, demographics and statistical analysis on how the listings are used, accessed, and treated by users.

Although certain illustrative embodiments and methods have been disclosed herein, it will be apparent form the foregoing disclosure to those skilled in the art that variations and modifications of such embodiments and methods may be made without departing from the true spirit and scope of the art disclosed. Many other examples of the art disclosed exist, each differing from others in matters of detail only. For instance, listing data can be related to listings for the sale or lease or various goods and services. Examples of listing data can include sale or lease of goods such as antiques, collectibles, bikes, boats, books, magazines, clothing, accessories, shoes, computers, electronics, cameras, furniture, related to health care, related to personal care, items for the home, items for the garden, jewelry, watches, movies, music recordings, office items, pet supplies, sports and outdoors items, toys and baby items, video games.

Listing data can also be related to goods and service listings related to automobiles, such as used cars, new cars, certified pre-owned, research services, blue book pricing services, parts and accessories, machinery, tools, etc. Listing data can also be related to pets, such as cats, dogs, horses, birds, and related pet services.

Listing data can also be related to housing services, such as homes for sale, rentals, roommates, find a realtor, today's mortgage rates, find a mover, credit reports. In addition, listing data can be related to tickets for events or traveling such as sports concerts, theater, Broadway, traveling destinations, hotels, airfares, etc.

Listing data can be related to employment such as search jobs, posting a resume, creating job alerts, get career advice, searching by job category, etc. Employment related listing data can also be used in HotJobs as provided by Yahoo Inc.

Listing data can also be listing for services. Listing for wanted services, health care, personal care, computer services, creative, erotic, financial, legal, automotive, lessons, household, moving services, construction services, skilled trade, real estate, therapeutic, etc.

Listing data can also be related to personals ads such as platonic or casual encounters, women seeking women, women seeking men, men seeking women, men seeking men, romantic dinners or dates.

In addition, listings can be presented in the form of banners, images, symbols, etc. Listing can also be hyperlinked to an Internet address. Listings can be presented as symbols, or areas in a map, etc. Furthermore, listing administration provider is any entity having a web site in which a lister user can include a listing, such as an advertisement, so that users visiting the web site of the listing administration provider can select the advertisement and redirected to the lister's web site.

As utilized herein, modules can be separate logical computer processes, separate hardware components, standalone computing devices, etc. Any web interface as provided herein can also be a computer application interface that does not interpret mark-up language but rather communicates directly in order to interface with a server computer.

Furthermore, it will also be apparent to one skilled in the art that the any computer network such as a LAN, WAN, wireless network, etc., can be utilized to implement data acquisition. Accordingly, it is intended that the art disclosed shall be limited only to the extent required by the appended claims and the rules and principles of applicable law. All patents, patent applications and printed publications referred to here are hereby incorporated by reference in their entirety.

The invention claimed is:

1. A method, comprising:
receiving, by a computing device operated by a listing service provider, a network address input by a lister into a web form field displayed by a client computer, wherein the network address is indicative of a location of listing data on a computer network, wherein the listing data comprises at least one information item provided by the lister, wherein the listing data is in a standardized information resource definition language unique to the listing service provider, wherein the information resource definition language is an extension of extensible markup language, and wherein the listing service provider publishes listing data received from a plurality of listers;
accessing, by the computing device operated by the listing service provider, the network address received from the client computer, wherein the network address is accessed by opening a computer network connection to retrieve the listing data;
storing, by the computing device operated by the listing service provider, the listing data in a listing data database; and
posting, by the computing device operated by the listing service provider, the listing data in a search bank hosted by the listing service provider.

2. The method of claim 1, wherein the listing data comprises job listings.

3. The method of claim 1, wherein the listing data comprises real estate listings.

4. The method of claim 1, further comprising analyzing the listing data at the listing data database for conformance to predetermined quality criteria.

5. The method of claim 1, further comprising categorizing the listing data stored in the listing data database into one or more predetermined categories and storing the categorized listing data in the search bank hosted by the listing service provider.

6. The method of claim 1, further comprising transferring selected categorized job information data from the search bank through a job search client server to a job searcher in response to a query by the job searcher.

7. The method of claim 1, further comprising posting the listing data on an Internet website.

8. The method of claim 1, further comprising providing an Internet website wherein a lister can administrate the listing data provided to the listing service provider.

9. The method of claim 1, wherein the information resource definition language comprises a job element.

10. The method of claim 9, wherein the job element comprises an employer company attribute and a job title attribute.

11. The method of claim 1, wherein the information resource definition language comprises a real estate element.

12. The method of claim 11, wherein the real estate element comprises a location attribute and a price attribute.

13. The method of claim 1, wherein the network address is a uniform resource locator.

14. The method of claim 1, wherein the network address is provided by any one of entering a uniform resource locator in an Internet web form hosted by the listing service provider, or transmitting the uniform resource locator as part of a hypertext source code tag.

15. A system, comprising:
a server computer operated by a listing service provider;
an address receiving module implemented by said server, that receives a network address input by a lister into a web form field provided by the address receiving module, wherein the network address is indicative of a location of listing data on a computer network, wherein the listing data comprises at least one information item provided by the lister, wherein the listing data is in a standardized information resource definition language unique to the listing service provider, wherein the information resource definition language is an extension of extensible markup language, and wherein the listing service provider publishes listing data received from a plurality of listers;
a web crawling module implemented by said server, that accesses the network address received from the lister, wherein the network address is accessed by opening a computer network connection to retrieve the listing data, the web crawling module configured to store the listing data in a listing data database; and
a search bank hosted by the listing service provider for posting the listing data.

16. The system of claim 15, wherein the listing data comprises job listings.

17. The system of claim 15, wherein the listing data comprises real estate listings.

18. The system of claim 15, further comprising a listing manager that analyzes the listing data at the listing data database for conformance to predetermined quality criteria.

19. The system of claim 15, further comprising a listing manager that categorizes the listing data stored in the listing data database into one or more predetermined categories and stores the categorized listing data in the search bank hosted by the listing service provider.

20. The system of claim 15, further comprising a listing manager that transfers selected categorized job information data from the search bank through a job search client server to a job searcher in response to a query by the job searcher.

21. The system of claim 15, further comprising an Internet website wherein the listing data is posted.

22. The system of claim 15, further comprising an Internet website wherein a lister can administrate the listing data provided to the listing service provider.

23. The system of claim 15, wherein the information resource definition language comprises a job element.

24. The system of claim 23, wherein the job element comprises an employer company attribute and a job title attribute.

25. The system of claim 15, wherein the information resource definition language comprises a real estate element.

26. The system of claim 25, wherein the real estate element comprises a location attribute and a price attribute.

27. The system of claim 15, wherein the network address is a uniform resource locator.

28. The system of claim 15, wherein the network address is provided by any one of entering a uniform resource locator at Internet web form hosted by the listing service provider, or transmitting the uniform resource locator as part of a hypertext source code tag.

29. A computer readable storage medium tangibly encoding a computer program of instructions for executing a computer process for data acquisition, the computer process comprising:
receiving a network address input by a lister into a web form field displayed by a client computer, wherein the network address is indicative of a location of listing data on a computer network, wherein the listing data comprises at least one information item provided by the lister, wherein the listing data is in a standardized information resource definition language unique to a listing service provider, wherein the information resource definition language is an extension of extensible markup language, and wherein the listing service provider publishes listing data received from a plurality of listers;

accessing the network address received from the client computer, wherein the network address is accessed by opening a computer network connection to retrieve the listing data;

storing the listing data in a listing data database; and posting the listing data in a search bank hosted by the listing service provider.

30. The computer readable storage medium of claim 29, wherein the listing data comprises job listings.

31. The computer readable storage medium of claim 29, wherein the listing data comprises real estate listings.

32. The computer readable storage medium of claim 29, further comprising analyzing the listing data at the listing data database for conformance to predetermined quality criteria.

33. The computer readable storage medium of claim 29, further comprising categorizing the listing data stored in the listing data database into one or more predetermined categories and storing the categorized listing data in the search bank hosted by the listing service provider.

34. The computer readable storage medium of claim 29, further comprising transferring selected categorized job information data from the search bank through a job search client server to a job searcher in response to a query by the job searcher.

35. The computer readable storage medium of claim 29, further comprising posting the listing data on an Internet website.

36. The computer readable storage medium of claim 29, further comprising providing an Internet website wherein a lister can administrate the listing data provided to the listing service provider.

37. The computer readable storage medium of claim 29, wherein the information resource definition language comprises a job element.

38. The computer readable storage medium of claim 37, wherein the job element comprises an employer company attribute and a job title attribute.

39. The computer readable storage medium of claim 29, wherein the information resource definition language comprises a real estate element.

40. The computer readable storage medium of claim 39, wherein the real estate element comprises a location attribute and a price attribute.

41. The computer readable storage medium of claim 29, wherein the network address is a uniform resource locator.

42. The computer readable storage medium of claim 29, wherein the network address is provided by any one of entering a uniform resource locator at Internet web form hosted by the listing service provider, or transmitting the uniform resource locator as part of a hypertext source code tag.

\* \* \* \* \*